Oct. 18, 1932.  E. S. COLE  1,883,582
SHIP'S LOG OR LIKE DEVICE
Filed May 3, 1926   2 Sheets-Sheet 1
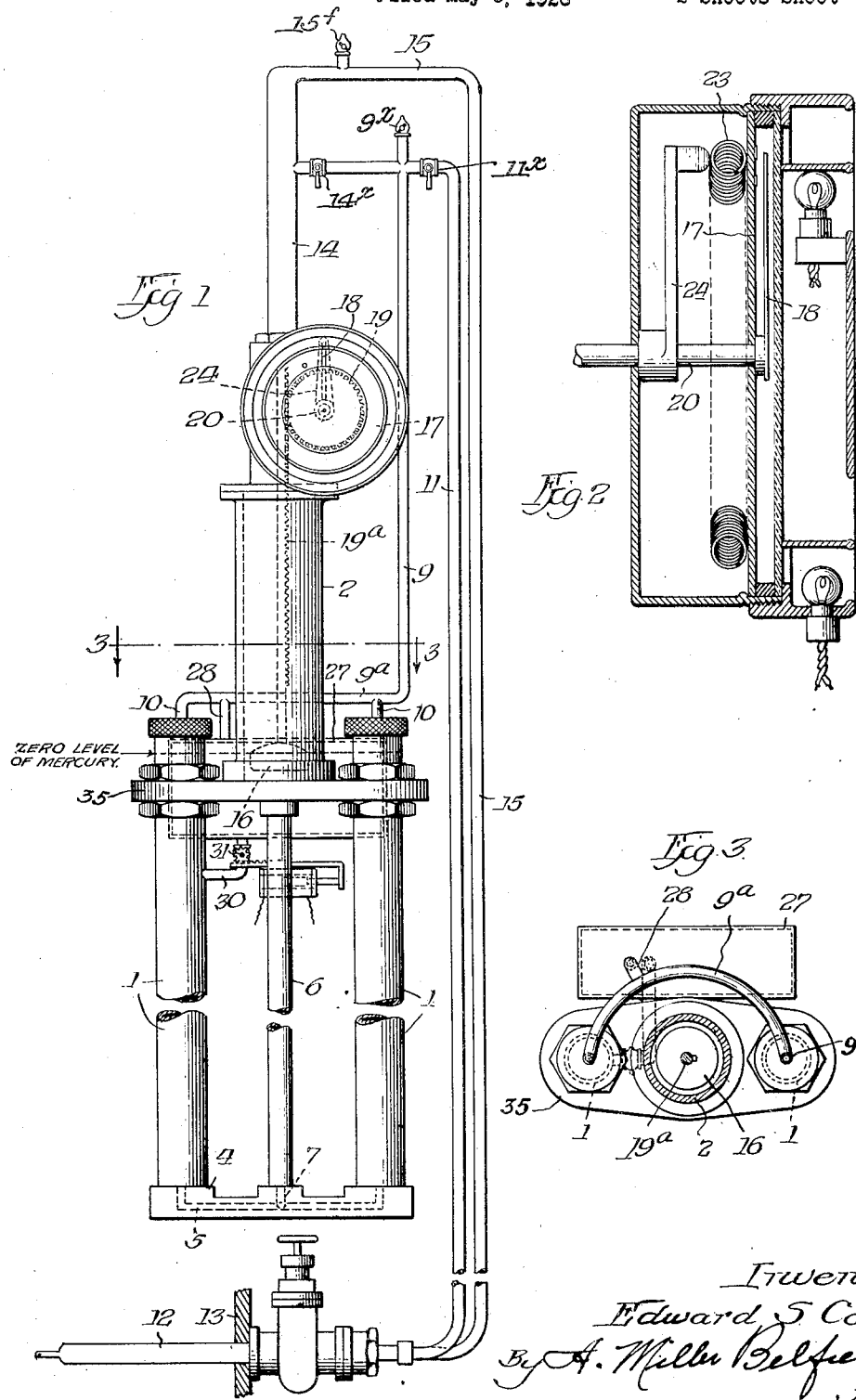

Oct. 18, 1932.  E. S. COLE  1,883,582
SHIP'S LOG OR LIKE DEVICE
Filed May 3, 1926  2 Sheets-Sheet 2
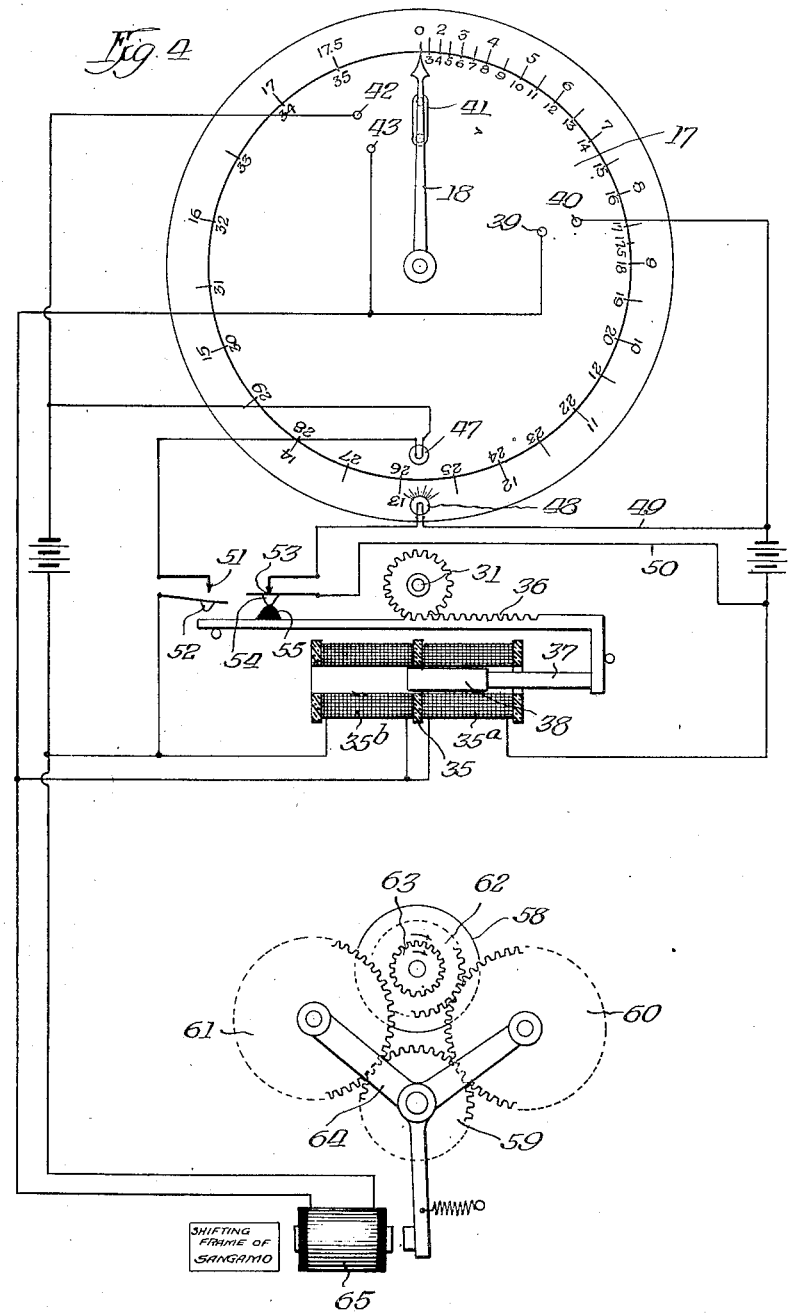

Patented Oct. 18, 1932

1,883,582

UNITED STATES PATENT OFFICE

EDWARD S. COLE, OF NEW YORK, N. Y.

SHIP'S LOG OR LIKE DEVICE

Application filed May 3, 1926. Serial No. 106,565.

My invention relates to ship logs or like devices.

One of the objects of the invention is to provide a practical and effective construction of device of the class specified.

Another object of the invention is to secure accuracy of indication and recording in both high and low speeds in devices of the class specified.

Another object of the invention is to secure simplicity and reliability of action in devices of this kind, and particularly in devices wherein accuracy is secured for both high and low speeds.

Other objects of the invention will appear and be pointed out hereinafter.

Referring to the drawings, Fig. 1 is a side elevation of a ship log or like device embodying my invention, and shown more or less diagrammatically;

Fig. 2 is a vertical section of the dial arrangement of the device on an enlarged scale;

Fig. 3 is a cross section taken on line 3—3 in Fig. 1;

Fig. 4 is a view showing the indicating dial of the device and the electrical circuit arrangement for controlling the operation of the instrument.

Referring to the drawings, and particularly at present to Figs. 1, 2 and 3, I show a Pitot tube or rod meter arrangement which is adapted for connection with pressure tubes having different pressures so that the height of mercury in the two sides of the tube will be different and will be varied in accordance with the difference in the pressures on the two sides of the tube. While this Pitot tube arrangement could be given various forms, I find an advantageous form is to have two tubes 1—1 constituting what may be called a duplex tube as one side of the mercury U-tube, and to have an intermediate tube as 2 and 6 constitute the other side of the U-tube. The two tubes 1—1 are connected together at their lower ends by a connecting member 4 provided with a connecting passage 5, and a connection 6 extends from the connecting member 4 to the tube 2, the interior of tube 6 communicating with connecting passage 5 by means of duct or passage 7. The duplex tube 1—1 is to be connected with the high pressure source, as for example the high pressure or velocity orifice of a ship log arrangement, the connection shown being a tube 9 having branches 10—10 extending to the tubes 1—1, and having its other end connected with a tube 11 running to a rod meter 12, which is understood to be projected through the side 13 or bottom of a boat or ship carrying the apparatus, the tube 11 being connected with the high pressure or velocity orifice of said rod meter 12. The other tube 2 which may be called the mercury float chamber or tube is connected with the other or low pressure source, which in the case of a ship log would be the static orifice of the rod meter, the connection shown consisting of a tube 14 extending from the top of tube 2 and connecting with tube 15 which also runs to rod meter 12 and is connected with the static orifice thereof.

Within float chamber 2 is a float 16 which will rise and fall with the variations in the level of the mercury in float chamber 2, whereby as the speed of the ship varies and the difference in pressure in tubes 1—1 and tube 2 varies, the position of float 16 will vary, rising as the ship speed increases and falling as it decreases.

The float 16 is shown arranged to cooperate with a dial 17 carrying a pointer 18 to indicate ship speed, the connection conveniently consisting of a rack 19ᵃ on the float 16 and a pinion 19 carried by the spindle 20 carrying pointer 18, whereby variations in the height of the float 16 cause rotation of the pinion and thereby vary the position of pointer 18 with reference to dial 17. The instrument is provided with means by which the movement of the spindle 20 with the carrying pointer 18 will cause variations in an electrical resistance device 23 through the means of a contact arm 24 carried by said spindle 20 whereby this variation in resistance may be taken advantage of to actuate or control electrical instruments to indicate or record the ship's speed and its total movement, or both. As that feature of the instrument is not involved in my present invention, I will not describe it further herein. Reference may be made to the application of myself, Ernest R. Howland and George B. Crouse for ship log, Serial No. 728,798, filed July 28, 1924.

Inasmuch as the movement of the mercury float 16 varies in accordance with the square of the velocity or speed of the ship, it is apparent that for low speeds the extent of movement of pointer 18 will be comparatively small and consequently the indication or recording of these low speeds will not be especially accurate. For example, considering the entire dial 17, referring to Fig. 4, to measure the full speed which it is desired to indicate by the instrument, the indication of one-half of the maximum speed to be indicated will involve the movement of the pointer 18 only one quarter of the dial circumference. That is to say, if the maximum speed to be indicated is 35 knots, the pointer 18 will move substantially around the entire dial or approximately 360 degrees to indicate this 35 knots, but one-half of that speed, 17½ knots, will be indicated by the pointer 18 by its movement of only one-quarter of the dial. This is shown by the inner row of figures on dial 17 in Fig. 4, the said inner row of figures running from zero up to 35, the half speed 17½ being about a quarter of the total circumference of the dial and the full speed 35 being nearly 360 degrees. Thus the indication of the first half of the speed, that is up to 17½ knots for example, taking only 90 degrees of the dial, will not be as accurate as the remaining portion of the indication.

My invention contemplates the use of the full dial for indicating speeds up to one-half of the maximum speed to be indicated, and also the use of the full dial for indicating speeds from half speed up to maximum speed. In other words the invention contemplates the arrangement of the instrument so that for low speeds the full dial may be used, and also its arrangement so that for high speed the full dial may also be used. This involves construction and operation of the instrument in such way that the full dial may be used for either high or low speeds as desired.

As one arrangement for carrying out the invention I show herein a supplemental high pressure mercury chamber such as the mercury chamber 27 which may be used in conjunction with the pressure tubes 1—1 if desired, or may not be used in conjunction with those tubes. For use in conjunction with tubes 1—1, a connection 28 is shown, said connection extending from the horizontal portion 9a of tube 9 to the top of chamber 27. A tube connection 30 extends between one of the tubes 1 and the supplemental mercury chamber 27, said tube containing a valve 31 by opening which a connection may be established between tubes 1—1 and chamber 27, so as to cause high pressure from the velocity side of the rod meter to be applied in the mercury chamber formed by the tubes 1—1, and also in the mercury chamber formed by chamber 27. When the valve 31 is open both of the mercury tubes 1—1 and chamber 27 receive high pressure from the velocity orifice of the rod meter, but when said valve 31 is closed only the tubes 1—1 respond to such high velocity pressure because the supplemental mercury chamber 27 is not connected with either tube 1—1, and consequently is not connected with the float chamber 2, and hence supplemental chamber 27 is not effective in connection with float chamber 2. When, however, valve 31 is open the high velocity pressure effective on the float supplemental chamber 17 and the tubes 1—1 produces much greater movement at a given speed than when the valve 31 is closed.

In order to illustrate, let it be assumed that—

$A$ = Area of float chamber 2
$B$ = Area of tubes including auxiliary chamber $1+1+27$
$b$ = Area of small tubes only $1+1$
$D$ = Float lift in area $A$;
$H_1$ = Total deflection in feet, with valve 31 closed
$H_2$ = Total deflection in feet, with valve 31 open
$R$ = Ratio of areas of float chamber to the small tubes
$R_2$ = Ratio of areas of float chamber to the large tubes It is known that for pitometer tubes—

$$V = C\sqrt{2gH}$$

where C is a constant which may be assumed to be 1.0.

Hence it is seen that half the velocity equals one quarter the deflection or $$\frac{V}{2} = \frac{H}{4}.$$

Assume $V_1 = 35$ knots and $V_2 = 17.5$ knots, in which case $H_1 = 4.4$ ft. approximately and $H_2 = 1.1$ ft. (of mercury).

Assume $D = 1$ ft. Then since the volume displaced in $A$ must equal the volume displaced in tubes $1+1$ and 27 combined, and since the tubes are of uniform bore it follows that the rise of mercury in tube A and the fall in tubes 1—1, or in 1—1 and 27 combined will be inversely as their areas. Hence we have:

$$R_1 = \frac{A}{b} = \frac{H_1 - D}{D} = \frac{4.4 - 1}{1} = 3.4$$

and $$R_2 = \frac{A}{B} = \frac{H_2 - D}{D} = \frac{1.1 - 1}{1} = .1$$

Hence area A is 3.4 × area $b$, small tubes only, and area A is $\frac{1}{10}$ area B, combined areas.

The combined or enlarged, or the reduced or single pressure chamber may be secured, either one or the other at will, by manipulating the valve 31 as previously explained, and that if desired may be done manually. As a preferred arrangement however, it is done automatically, and preferably in such manner as to give the results above indicated, that is the use of the combined or enlarged pressure chamber for low speeds up to 17½ knots per hour, and the single or reduced pressure chamber for higher speeds up to a maximum of 35 knots per hour.

In the arrangement shown, which is one of various possible arrangements for this purpose, I show the valve 31 automatically operated by an electromagnet 35, as for example, by means of a rack 36, actuated by a plunger 37 connected with the movable solenoid 38 of the magnet. This magnet 35 is connected with contacts 39 and 40 on the face of the dial 17, the contacts 39 and 40 cooperating with a contact 41 on pointer 18. Other contacts 42 and 43 are on the dial 17 also, and these are connected with one end of coil $35b$ of magnet 35, and the other contacts 39 and 40 being connected with the other end or coil $35a$ of magnet 35.

Assuming cock 31 is closed, then as pointer 18 moves around the dial upward as the speed of the ship increases, contact 41 will make connection between contacts 39 and 40, and consequently coil $35a$ will be energized and plunger 38 will move to the right and cause rack 36 to open valve 31, and thereby establish the enlarged or combined mercury pressure chamber, and since contacts 39 and 40 are located preferably at numerals indicating a speed of 17½ knots an hour on the high speed arrangement of the dial, the enlarged high pressure chamber may be made effective at that time, that is at a speed of 17½ knots per hour, and the enlarged pressure chamber will thereby become effective and cause the low ratio or low speed arrangement of the apparatus to become operative, and hence the pointer 18 will be moved by the larger movements of the mercury float around the dial somewhat less than 360 degrees, to the numerals for the 17½ knot speed for the low speed arrangement, such numerals being the outer row of numerals on dial 17. As long as the ship speed continues in this area less than 17½ knots, the indications will be for the whole capacity of the dial, being the low speed or low ratio setting of the instrument. When however, the ship speed equals or exceeds 17½ knots, the pointer 18 by its contact 41 will make connection between contacts 42 and 43 and will thereby energize coil $35b$ on magnet 35 and cause the plunger 38 to move to the left and close valve 31. This will make effective only the reduced pressure chamber area and consequently will bring about the high speed or high ratio setting of the instrument and cause the pointer 18 to drop back substantially to 17½ knots on the high speed or inner portion of the dial 17, and thus for speeds of 17½ knots or above, the indication of the instrument will be for the high speed arrangement, and it will continue in this way as long as the speeds remain high. When, however, the speed becomes low again the pointer 18 will connect contacts 39 and 40, and thereby make effective the low speed or low ratio arrangement and throw the pointer 18 into such low speed use of the dial and cause the indication of low speeds on the entire dial.

In Fig. 1 are shown two blow-off valves, one valve $15^r$ in line 15 and another valve $9^x$ in line 9. These valves are for clearing or freeing the system of any air accumulation and are operated preferably previous to using the device; that is, before starting the ship upon which the log is mounted.

A valve $14^x$, when open, allows communication between the two chambers 1—1 and 2; that is, the dynamic and static, or high and low pressure chambers, and when thus opened will allow the pressure to equalize and the mercury level in each chamber to read at zero. However, the valve indicated at $11^x$ should first be closed so as to prevent the pressure in the dynamic line 11 from interfering. In the normal position for operation, however, this valve $11^x$ is open. The valve $14^x$ is thus opened so that, as stated, the mercury may reach zero point. The opening of this valve, it will be understood, is momentary and preferably operated by hand just prior to the closing of the aforementioned valve 31.

After these valves have been operated to bring the mercury to a common level and the pointer 18 to read at zero and the valve 31 closed, with the auxiliary chamber 27 out of communication with the U tube, the device is then set for high speed range, using the inner row of figures from 0 to 35 knots. The change from high speed range to low speed range is affected at any time simply by the opening of valve 31, which may be done automatically or manually. It is necessary to prevent contacts 39—40 being closed by the contact 41 thus opening the valve 31 as the pointer rises from zero. This is so as not to disturb the high speed setting. This is accomplished by manually resisting the travel of the plunger 38 of the solenoid or by momentarily opening the circuit between these contact points and the solenoid.

In order to show which speed is effective I preferably provide indicating means which also operate automatically, the indication being preferably by means of lights which will illuminate the portion of the dial used, that is when the instrument is recording high speeds the high speed portion of the dial will be indicated and when indicating low speeds the low speed portion of the dial will be indicated.

As a simple arrangement I provide electric lights 47 and 48, the former for indicating high speeds, and the latter for indicating low speeds, and these lights are connected in a supplemental circuit 49—50, including contacts 51, 52, 53 and 54, contacts 52 and 54 being adapted to cooperate with a contact 55 on rack bar 36, so that when the magnet 35 is operated to open and close the valve 31, the light 47 will be lighted when the high speed or high ratio arrangement is effective, and also illuminate the light 48 when the low speed or low ratio arrangement is effective.

Thus it will be seen at once whether the instrument is operating at low or high speed, and the reading for such speeds may be made.

The apparatus is preferably provided with recording mechanism in the form of a register or like device of any conventional type by which the mileage will be recorded, by a plurality of numbered counting wheels. In accordance with my invention I desirably arrange so that this counting mechanism will be driven at a higher or lower rate of speed so as to secure the operation of the counting mechanism, in accordance with the high or low speed indication on the dial of the instrument.

To such end I show a counting mechanism or distance recorder 58 preferably comprising an ampere hour meter having counting wheels adapted to show the total number of miles traveled by the ship, and a gear connection arranged for use in or upon this ampere hour meter comprising a gear 59 and gears 60 and 61 meshing with gear 59 and in turn adapted to mesh respectively with gears 62 and 63, said gears 60 and 61 being mounted on a swinging frame 64, and the frame 64 being actuated by an electromagnet 65 in the indicating dial circuit, whereby when the low speed connection is made for the indicating dial, the gear 60 will be in mesh with gear 62 and so make a low speed record, and also whereby when the high speed connection for the indicator is made, the gear 61 will be moved, due to the energizing of magnet 65 by the indicating dial circuit and will be in mesh with gear 63 and larger record, or high speed record will be made.

The mileage recording device may be actuated by the float by means of any conventional mechanism (not shown) for connecting the two together.

It will be understood that changes and modifications may be made without departing from the spirit of the invention.

What I claim is:

1. A ship log having indicating means having different speed ranges and adapted to be operated selectively through one amplitude for one range of speed and through another amplitude for another range of speed.

2. A ship log having speed indicating mechanisms for indicating different speeds, means for selectively operating said mechanisms through one amplitude for high speeds and through a relatively greater amplitude for low speeds.

3. A ship log having indicating means adapted to be operated selectively through one amplitude for one range of speed and through another amplitude for another range of speed, and automatic means for changing the amplitude-controlling means.

4. Apparatus of the class specified comprising speed indicating mechanism having a duplex dial for indicating high and low speed ranges, means for actuating said mechanism with relative slowness for high speeds and with relative quickness for low speeds, and means for controlling the operation of said mechanism so as to cause its operation for either high or low speeds.

5. Apparatus of the class specified comprising speed indicating mechanism having a duplex dial for indicating high and low speed ranges, means for actuating said mechanism with relative slowness for high speeds and with relative quickness for low speeds, and means for controlling the operation of said mechanism so as to cause its operation for either high or low speeds, and means whereby said last mentioned means may be operated automatically to cause operation for high or low speeds as the case may be.

6. Apparatus of the class specified comprising speed indicating mechanism having a duplex dial for indicating high and low speed ranges, means for operating the same according to the variations in pressure caused by variations in speed and means whereby said speed indicating mechanism may have a relatively rapid operation for low speeds and a relatively slow operation for high speeds.

7. Apparatus of the class specified comprising speed indicating mechanism having a duplex dial for indicating high and low speed ranges, means for operating the same according to the variations in pressure caused by variations in speed, and means whereby said speed indicating mechanism may have a relatively rapid operation for low speeds and a relatively slow operation for high speeds, and means for controlling said last mentioned means automatically to cause the rapid operation for low speeds and the slow operation for high speeds.

8. Apparatus of the class specified comprising speed indicating mechanism having a duplex dial for indicating high and low speed ranges, means for operating the same to indicate a ship's speed, and mechanism for changing the method of operation of said operating means so as to cause the same to operate with relative rapidity for low speeds and with relative slowness for high speeds.

9. Apparatus of the class specified comprising speed indicating mechanism having a duplex dial for indicating high and low speed ranges, Pitot tube devices for actuating the same, and means for changing the method of operation of said Pitot tube devices so as to cause the relatively rapid operation of the speed indicating mechanism for low speeds and the relatively slow operation of the same for high speeds.

10. Apparatus of the class specified comprising speed indicating mechanism having a duplex dial for indicating high and low speed ranges, Pitot tube devices for actuating the same, and means for changing the method of operation of said Pitot tube devices so as to cause the relatively rapid operation of the speed indicating mechanism for low speeds and the relatively slow operation of the same for high speeds, said last mentioned means being provided with mechanism for automatically controlling it so as to cause the high speed operation for low speeds, and the slow speed operation for high speeds.

11. Apparatus of the class specified comprising speed indicating mechanism having a duplex dial for indicating high and low speed ranges and means whereby the same may be actuated, relatively large and relatively small amounts for the same unit of speed, whereby the relatively large actuation may be used for low speeds and the relatively small actuation for high speeds.

12. Apparatus of the class specified comprising speed indicating mechanism having a duplex dial for indicating high and low speed range, means whereby the same may be actuated, relatively large and relatively small amounts for the same unit of speed, whereby the relatively large actuation may be used for low speeds and the relatively small actuation for high speeds, and means for effecting automatic control of the apparatus so as to cause the relatively large actuations for low speed and the relatively small actuations for high speed.

13. Apparatus of the class specified comprising speed indicating mechanism having a duplex dial for indicating high and low speed ranges and Pitot tube mechanism for operating said speed indicating mechanism, said Pitot tube mechanism being adapted and arranged for operation of the speed indicating mechanism, relatively large amounts for low speeds and also relatively small amounts for high speeds.

14. Apparatus of the class specified comprising speed indicating mechanism having a duplex dial for indicating high and low speed ranges and Pitot tube mechanism for operating said speed indicating mechanism, said Pitot tube mechanism being adapted and arranged for operation of the speed indicating mechanism, relatively large amounts for low speeds and also relatively small amounts for high speeds, and means for automatically controlling the apparatus so that the speed indication will be relatively large for low speeds and relatively small for high speeds.

15. Apparatus of the class specified comprising speed indicating mechanism, Pitot tube mechanism for actuating the same and means whereby the effective pressure area of the Pitot tube mechanism may be varied to cause the operation of the speed indicating mechanism different amounts for the same unit of speed.

16. Apparatus of the class specified comprising speed indicating mechanism, Pitot tube mechanism for actuating the same and means whereby the effective pressure area of the Pitot tube mechanism may be varied to cause the operation of the speed indicating mechanism different amounts for the same unit of speed, said Pitot tube mechanism comprising a plurality of pressure chambers, one or more of which may be used as desired to secure the different effective pressure area.

17. Apparatus of the class specified comprising speed indicating mechanism, Pitot tube mechanism for actuating the same and means whereby the effective pressure area of the Pitot tube mechanism may be varied to cause the operation of the speed indicating mechanism different amounts for the same unit of speed, said Pitot tube mechanism comprising a plurality of pressure chambers, one or more of which may be used as desired to secure the different effective pressure area, and means for automatically rendering the larger or smaller pressure area effective as desired.

18. Apparatus of the class specified comprising speed indicating mechanism, Pitot tube mechanism comprising a plurality of pressure chambers, one or more of which may be made operative to vary the operation of the speed indicating mechanism, and electrical means for automatically controlling the number of effective pressure chambers.

19. Apparatus of the class specified comprising speed indicating mechanism, Pitot tube mechanism for operating the same, said Pitot tube mechanism comprising a plurality of pressure chambers and means for rendering one or more of the same effective, and electrical means for controlling the number of pressure chambers made effective, said means comprising electrical contacts on the speed indicating mechanism, and electromagnetic devices controlled by said contacts and arranged to actuate the means for controlling the number of pressure chambers made effective.

20. Apparatus of the class specified comprising a dial and a rotary pointer operable in connection with the dial, Pitot tube mechanism for operating the pointer, said Pitot tube mechanism comprising a plurality of pressure chambers and means whereby the number used may be varied.

21. Apparatus of the class specified comprising a dial and a rotary pointer operable in connection with the dial, Pitot tube mechanism for operating the pointer, said Pitot tube mechanism comprising a plurality of pressure chambers and means whereby the number used may be varied, and electrical means for controlling the means for determining the number of pressure chambers made effective, said electrical means comprising electrical contacts on the dial and cooperating contacts on the pointer, and circuit connections containing electromagnets for controlling the means for determining the number of effective pressure chambers.

22. Apparatus of the class specified comprising a dial provided with a plurality of sets or series of indicating characters, one set being useful for high speeds and the other set for low speeds, a rotary pointer cooperating with said dial, and Pitot tube mechanism for controlling the operation of the pointer, said Pitot tube mechanism comprising a plurality of pressure chambers the number of which in use may be varied so that said pointer may be used in connection with either one or the other of said sets or series of indicating characters.

23. Apparatus of the class specified comprising a dial provided with a plurality of sets or series of indicating characters, one set being useful for high speeds and the other set for low speeds, a rotary pointer cooperating with said dial, and Pitot tube mechanism for controlling the operation of the pointer, said Pitot tube mechanism comprising a plurality of pressure chambers the number of which in use may be varied so that said pointer may be used in connection with either one or the other of said sets or series of indicating characters, and means for automatically controlling the number of pressure chambers in use.

24. Apparatus of the class specified comprising a dial provided with a plurality of sets or series of indicating characters, one set being useful for high speeds and the other set for low speeds, a rotary pointer cooperating with said dial, and Pitot tube mechanism for controlling the operation of the pointer, said Pitot tube mechanism comprising a plurality of pressure chambers the number of which in use may be varied so that said pointer may be used in connection with either one or the other of said sets or series of indicating characters, and means for automatically controlling the number of pressure chambers in use, said means comprising electrical contacts on the dial and cooperating contacts on the pointer, said contacts being included in electrical circuits containing electromagnetic devices for operating the means for determining the number of pressure chambers in use.

25. Apparatus of the class specified comprising a dial provided with two sets of numerals, one set for high speeds and the other set for low speeds, a rotary pointer for use in connection with the dial, Pitot tube mechanism for operating the pointer, said mechanism comprising a plurality of mercury pressure chambers and a valved connection between certain of said chambers whereby the number of chambers made effective may be varied.

26. Apparatus of the class specified comprising a dial provided with two sets of numerals, one set for high speeds and the other set for low speeds, a rotary pointer for use in connection with the dial, Pitot tube mechanism for operating the pointer, said mechanism comprising a plurality of mercury pressure chambers and a valve between certain of said chambers whereby the number of chambers made effective may be varied, and means for automatically controlling said valve to cause a relatively large pressure area for low speeds and a relatively small pressure area for high speeds.

27. Apparatus of the class specified comprising a dial provided with two sets of numerals, one set for high speeds and the other set for low speeds, a rotary pointer for use in connection with the dial, Pitot tube mechanism for operating the pointer, said mechanism comprising a plurality of mercury pressure chambers, and a valve between certain of said chambers whereby the number of chambers made effective may be varied, and means for automatically controlling said valve to cause a relatively large pressure area for low speeds and a relatively small pressure area for high speeds, said last mentioned means comprising electrical contacts on the dial and pointer and circuits controlled by said contacts and containing electromagnetic devices for operating said valve.

28. Apparatus of the class specified comprising speed indicating mechanism and means for actuating the same in different ways for different speeds, gearing having a variable transmitting ratio adapted to transmit motion to a distance recording means, and means actuated by said actuating means for controlling variable gearing according as the apparatus is arranged for indicating either high or low speeds.

29. The combination of Pitot tube mechanism comprising a plurality of pressure chambers and means whereby the number of chambers made effective may be varied.

30. The combination with Pitot tube mechanism provided with a pressure chamber of means for varying the effective area of said pressure chamber.

31. The combination of Pitot tube mechanism provided with a pressure chamber and means for varying the effective area of the pressure chamber and indicating mechanism operated by said Pitot tube mechanism.

32. The combination of Pitot tube mechanism provided with a pressure chamber and means for varying the effective area of the pressure chamber and indicating mechanism operated by said Pitot tube mechanism, said indicating mechanism comprising a dial having a plurality sets of numerals whereby different sets of numerals may be used according as the area of the pressure chamber is varied.

33. The combination of Pitot tube mechanism provided with a pressure chamber and means for varying the effective area of the pressure chamber and indicating mechanism operated by said Pitot tube mechanism, said indicating mechanism comprising a dial having a plurality sets of numerals whereby different sets of numerals may be used according as the area of the pressure chamber is varied, in combination with means for automatically controlling the variation in size of the effective pressure chamber and correspondingly controlling the operation of the indicating mechanism.

34. A ship log having indicating mechanism adapted to indicate different speed ranges and means for selectively operating said mechanism for one or another of said speed ranges.

35. A ship log comprising speed indicating mechanism adapted to indicate different speed ranges, means for actuating said mechanism with relative slowness for a relatively high speed and with relative rapidity for a relatively low speed, and means for controlling the operation of said actuating means so as to cause its operation selectively for either high or low speeds.

36. A ship log comprising Pitot tube mechanism, an instrument operated by said mechanism for indicating speed, gearing having a variable transmitting ratio adapted to transmit motion to a distance recording means, and means adapted to be actuated for controlling the variable gearing.

37. A ship log comprising Pitot tube mechanism, a device operated by said mechanism for indicating different speed ranges, gearing having a variable transmitting ratio adapted to transmit motion to a distance recording means, and means adapted to be actuated for controlling the variable gearing.

38. A ship log comprising Pitot tube mechanism involving a float and variable area pressure chamber arrangements controlling the movement of said float and mechanism for indicating different speed ranges, gearing having a variable transmitting ratio adapted to transmit motion to a distance recording means, and means adapted to be actuated for controlling the variable gearing.

In witness whereof, I hereunto subscribe my name this 9th day of April, A. D. 1926.

EDWARD S. COLE.